(12) United States Patent
Watanabe et al.

(10) Patent No.: US 11,791,639 B2
(45) Date of Patent: Oct. 17, 2023

(54) DISCHARGE CONTROL METHOD OF A BATTERY PACK FOR PORTABLE ELECTRONIC DEVICES

(71) Applicant: Lenovo (Singapore) Pte. Ltd., Singapore (SG)

(72) Inventors: Hiroyuki Watanabe, Kanagawa (JP); Hideshi Tsukamoto, Kanagawa (JP); Hiromitsu Yamaguchi, Kanagawa (JP); Daisuke Arai, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 56 days.

(21) Appl. No.: 17/350,499

(22) Filed: Jun. 17, 2021

(65) Prior Publication Data
US 2022/0407331 A1     Dec. 22, 2022

(51) Int. Cl.
*H02J 7/00*     (2006.01)
*H01M 10/44*     (2006.01)
(Continued)

(52) U.S. Cl.
CPC ....... *H02J 7/00304* (2020.01); *H01M 10/441* (2013.01); *H01M 50/209* (2021.01);
(Continued)

(58) Field of Classification Search
CPC .. H02J 7/00304; H02J 7/00047; H02J 7/0013; H02J 7/0044; H01M 10/441; H01M 50/209; H01M 50/247
(Continued)

(56) References Cited

U.S. PATENT DOCUMENTS 7,508,171 B2 *   3/2009   Carrier ..................... B25F 5/00
                                                    320/135
7,579,811 B2 *   8/2009   Sato ..................... H01M 10/482
                                                    320/132
(Continued)

FOREIGN PATENT DOCUMENTS

| JP | H0919053 A * | 1/1997 | ............. Y02E 60/10 |
|----|--------------|--------|-------------------------|
| JP | 3842705 B2 * | 11/2006 | ............. Y02E 60/10 |
| TW | 490871 B * | 6/2002 | ............. H02J 7/0031 |

OTHER PUBLICATIONS

Rokuto Takao "Charging Circuit for Storage Element, Voltage Equalizing Method, Charging Method and Voltage Detecting Method Using the Circuit", Machine Translation of (Year: 2006).*

(Continued)

*Primary Examiner* — M Baye Diao
(74) *Attorney, Agent, or Firm* — Osha Bergman Watanabe & Burton LLP

(57) ABSTRACT

A method is provided for controlling a discharge of a battery pack that supplies power to a portable electronic device. The battery pack has one or more cell blocks each having a plurality of battery cells connected in parallel. The method includes the following steps. Determining, for each of the one or more cell blocks, a value of a first supply current flowing through a first battery cell that has the smallest capacity among the plurality of battery cells. Comparing, for each of the one or more cell blocks, the value of the first supply current with a first overcurrent value of the first battery cell to detect overcurrent in the first battery cell. Generating, in response to detecting the overcurrent in the first battery cell of any of the one or more cell blocks, a first overcurrent signal to reduce the power supplied to the portable electronic device.

13 Claims, 9 Drawing Sheets

(51) Int. Cl.
*H01M 50/209* (2021.01)
*H01M 50/247* (2021.01)

(52) U.S. Cl.
CPC ......... *H01M 50/247* (2021.01); *H02J 7/0013* (2013.01); *H02J 7/0044* (2013.01); *H02J 7/00047* (2020.01)

(58) Field of Classification Search
USPC ........................................................ 320/134
See application file for complete search history.

(56) References Cited

U.S. PATENT DOCUMENTS

| | | | | |
|---|---|---|---|---|
| 7,642,753 B2* | 1/2010 | Simpson | ............... | H02J 7/0013 320/132 |
| 8,400,102 B2* | 3/2013 | Mizutani | ............... | H01M 10/46 320/118 |
| 9,035,618 B2* | 5/2015 | Lee | ............ | H02J 7/04 320/136 |
| 9,438,059 B2* | 9/2016 | Komoda | ............. | H01M 10/482 |
| 9,450,426 B2* | 9/2016 | Moorhead | ................. | H02J 7/00 |
| 9,660,461 B2* | 5/2017 | Dong | ................... | H01M 10/482 |
| 10,291,038 B2* | 5/2019 | Mei | ..................... | H01M 10/482 |
| 10,361,569 B2* | 7/2019 | Hayashizaki | ..... | H01M 10/4207 |
| 11,662,388 B2* | 5/2023 | Bae | ....................... | G01R 31/396 702/63 |
| 2005/0134230 A1* | 6/2005 | Sato | ....................... | H02J 7/0036 320/136 |
| 2008/0180059 A1* | 7/2008 | Carrier | ................ | H01M 10/443 320/112 |
| 2011/0304302 A1* | 12/2011 | Kim | .................... | H02J 7/00304 320/134 |
| 2012/0032646 A1* | 2/2012 | Lee | ....................... | H02J 7/0031 320/135 |

OTHER PUBLICATIONS

Rokuto Takao EP Translation of JP2004072975A which is the same as JP3842705B2 (Year: 2004).*

* cited by examiner

DISCHARGE CONTROL METHOD OF A BATTERY PACK FOR PORTABLE ELECTRONIC DEVICES

BACKGROUND

Battery packs provide power to portable electronic devices such as notebooks and laptop computers. Such a battery pack includes a plurality of identical battery cells (i.e., battery cells of equal size, capacity, and impedance) and a fuel gauge or battery management system that monitors the current, voltage, and temperature of the battery cells and monitors the state of the overall battery pack, including its discharge state. Battery packs, however, are susceptible to degradation. In case of excess degradation, a capacity of the battery pack decreases, which results in shorter discharge cycles.

SUMMARY

In general, one or more embodiments of the invention relate to a method for controlling a discharge of a battery pack that supplies power to a portable electronic device, wherein the battery pack comprises one or more cell blocks each comprising a plurality of battery cells connected in parallel, the method comprising: determining, for each of the one or more cell blocks, a value of a first supply current flowing through a first battery cell that has the smallest capacity among the plurality of battery cells; comparing, for each of the one or more cell blocks, the value of the first supply current with a first overcurrent value of the first battery cell to detect overcurrent in the first battery cell; and generating, in response to detecting the overcurrent in the first battery cell of any of the one or more cell blocks, a first overcurrent signal to reduce the power supplied to the portable electronic device.

In general, one or more embodiments of the invention relate to a battery pack for supplying power to a portable electronic device, comprising: one or more cell blocks each comprising a plurality of battery cells connected in parallel; and a first overcurrent detection circuit for each of the one or more of the cell blocks that: determines a value of a first supply current flowing through a first battery cell that has the smallest capacity among the plurality of battery cells, compares the value of the first supply current with a first overcurrent value of the first battery cell to detect overcurrent in the first battery cell, and generates, in response to detecting the overcurrent in the first battery cell, a first overcurrent signal to reduce the power supplied to the portable electronic device.

Other aspects of the invention will be apparent from the following description and the appended claims.

DETAILED DESCRIPTION

Figure 1:
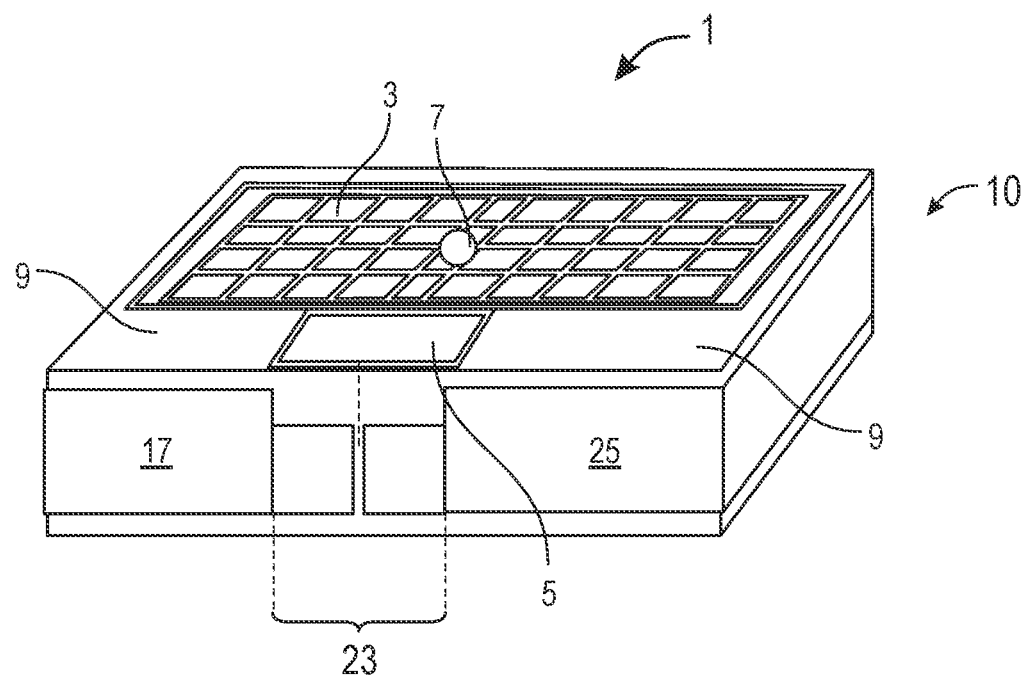
FIG. 1 shows a perspective view of a battery pack according to one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention relate to a method for controlling discharge of a battery pack for a portable electronic device, and a battery pack with discharge control for a portable electronic device.

FIG. 1 shows a partial perspective view of a portable electronic device 1 according to one or more embodiments. In this example, the portable electronic device 1 is a laptop comprising a battery pack 10, a keyboard 3, a trackpad 5, a TrackPoint® 7, and palm rests 9. The battery pack 10 has a first battery compartment 17, a second battery compartment 23, and a third battery compartment 25.

Figure 2:
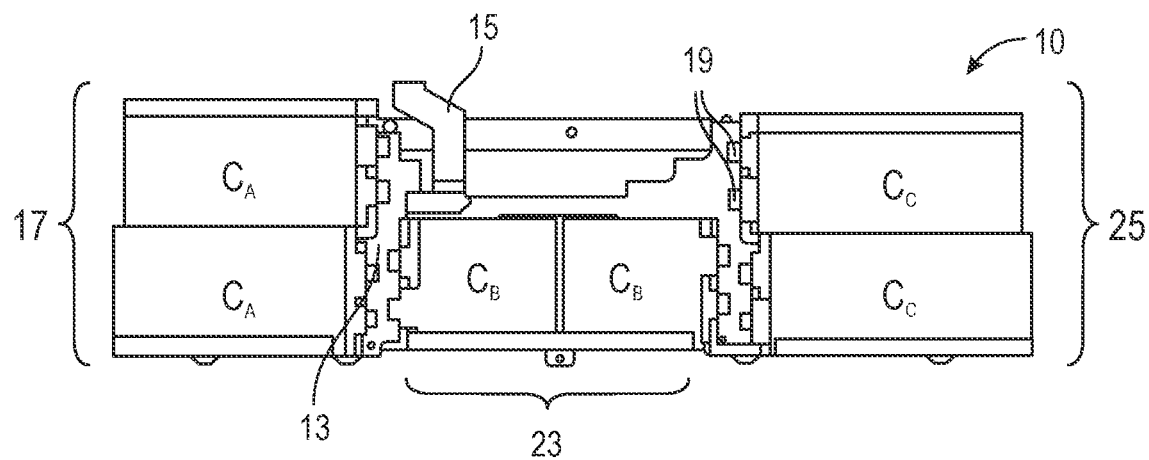
FIG. 2 shows a top view of the battery pack of FIG. 1 according to one or more embodiments.

FIG. 2 shows a top view of the battery pack 10 of FIG. 1 according to one or more embodiments. As shown, the battery pack 10 comprises two battery cells $C_A$ inserted into the first battery compartment 17, two battery cells $C_B$ inserted into the second battery compartment 23, and two battery cells $C_C$ inserted into the third battery compartment 25. Each of the battery cells $C_A$, $C_B$, $C_C$ comprises two metal tabs 19. All the metal tabs 19 are directly connected to a printed circuit board 13 which is connected to the laptop by cables 15. In one or more embodiments, the battery cells $C_A$, $C_B$, $C_C$ may be arranged in two cell blocks connected in series, with each cell block comprising three battery cells connected in parallel (i.e., a 2S3P configuration). In other embodiments, the battery cells $C_A$, $C_B$, $C_C$ may be arranged in one cell block with six battery cells connected in parallel (i.e., a 1S6P configuration). The battery cells $C_A$, $C_B$, $C_C$ may be lithium-ion battery cells.

In one or more embodiments, the battery compartments 17, 23, 25 may be configured to accept different sized batteries to maximize space efficiency and increase the total capacity of the battery pack 10. For example, as shown in FIG. 2, the battery cells $C_B$ may each have a smaller size than the battery cells $C_A$, the battery cells $C_A$ may each have a smaller size than the battery cells $C_C$, neither of which would fit into the compartment 17 which has the battery cells $C_A$. In one or more embodiments, using the battery cells $C_B$ and $C_C$ together with the battery cells $C_A$ may increase the total capacity of the battery pack 10 compared to using only the battery cells $C_A$. Such a battery pack including cells of different size, capacity, and impedance will be referred to herein as a "hybrid" battery pack.

Although FIG. 2 shows three pairs of battery cells, the battery pack according to one or more embodiments may have fewer or more battery cells connected in a variety of configurations depending on the specific requirements, dimensions, and design of the portable electronic device, as will become clear to a person of ordinary skill from the descriptions that follow.

FIGS. 3-8 and the corresponding descriptions below illustrate exemplary schematic representations according to one or more embodiments.

Figure 3:
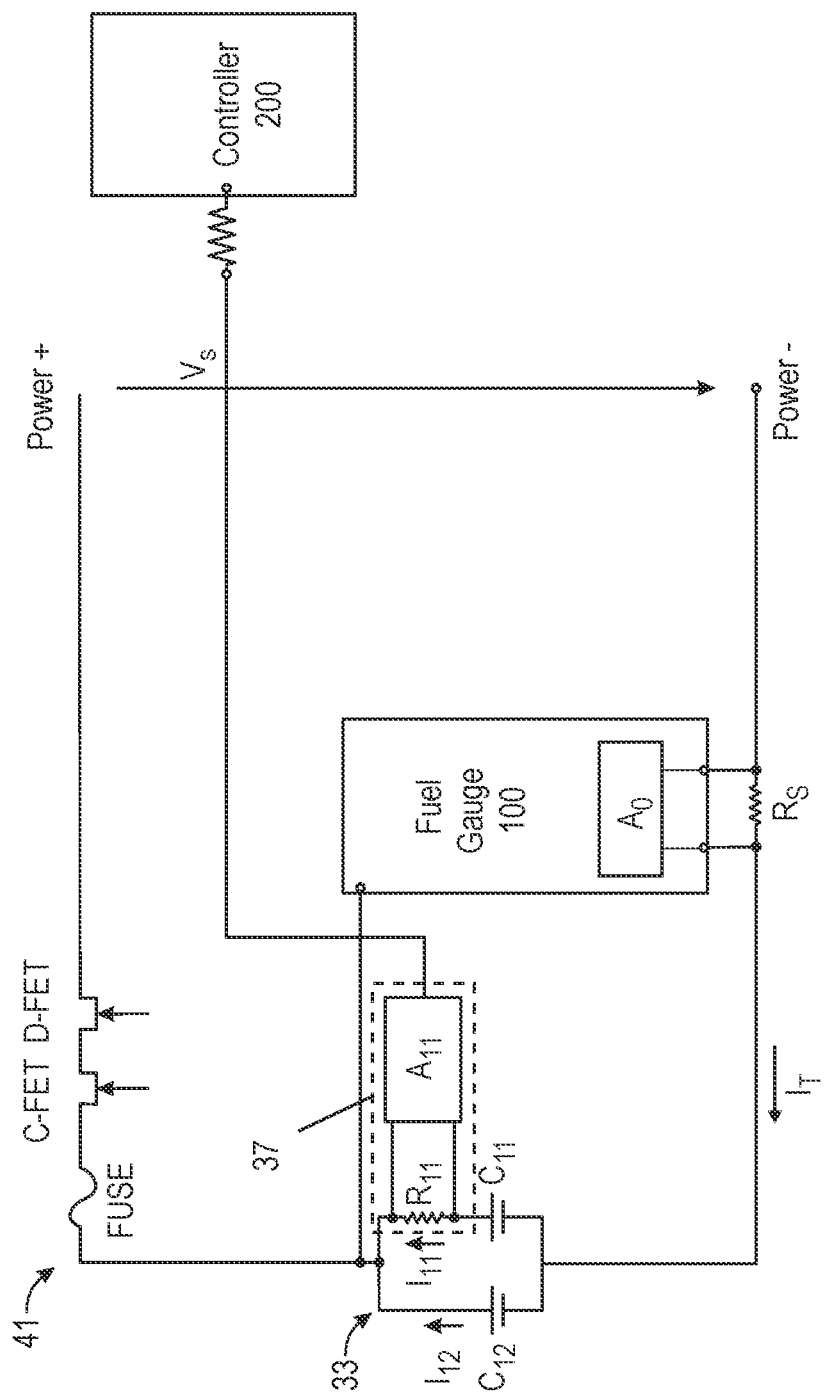
FIG. 3 shows a schematic diagram of a battery pack according to one or more embodiments.

FIG. 3 shows a schematic diagram of a hybrid battery pack 41 for a portable electronic device according to one or more embodiments. The battery pack 41 comprises a first cell block 33 with a first battery cell $C_{11}$ and a second battery cell $C_{12}$ connected to each other in parallel. In one or more embodiments, the first battery cell $C_{11}$ may be smaller in size and capacity than the second battery cell $C_{12}$ and may therefore be fitted into a space within the portable electronic device 1 that would be too small for a larger battery cell. The battery pack 41 further comprises a positive terminal "power +" and a negative terminal "power −" for providing power to the portable electronic device from the battery pack 41. A power supply voltage $V_S$ of the battery pack 41 is generated by the first and second battery cells $C_{11}$, $C_{12}$.

In general, if the supply current flowing through a battery cell is higher than a predefined threshold or overcurrent value, the battery cell may suffer excess degradation. The threshold or overcurrent value of each battery cell may be defined by the manufacturer of the battery cells.

In the example shown in FIG. 3, a fuel gauge 100 determines the power supply voltage $V_S$ and a total current $I_T$ flowing through the battery pack 41. The fuel gauge 100 determines the total current $I_T$ by measuring a total voltage across a sensing resistor $R_S$ connected in series to the first cell block 33 with a comparator $A_0$. The total current $I_T$ is a sum of a first supply current $I_{11}$ flowing through the first battery cell $C_{11}$ and a second supply current $I_{12}$ flowing through the second battery cell $C_{12}$. A power P of the battery pack 41 can be determined from the total current $I_T$ and the power supply voltage $V_S$. The fuel gauge 100 detects an overcurrent of the total current $I_T$ of the battery pack 41 and stops to supply the power P of the battery pack 41 to a portable electronic device, such as a notebook or a laptop computer, in response to detecting the overcurrent. At this point, a D-FET (discussed below) of the battery pack 41, controlled by the fuel gauge 100, is turned off.

Additionally, the battery pack 41 further comprises a first overcurrent detection circuit 37 including a first comparator $A_{11}$ and a first measuring resistor $R_{11}$ that is connected in series to the first battery cell $C_{11}$. The first comparator $A_{11}$ measures the voltage across the first measuring resistor $R_{11}$ and determines a value of the first supply current $I_{11}$ therefrom. Then, the first comparator $A_{11}$ compares the value of the first supply current $I_{11}$ with a first overcurrent value $I_{11}^{max}$ of the first battery cell $C_{11}$. In one or more embodiments, the first comparator $A_{11}$ obtains the first overcurrent value $I_{11}^{max}$ from a memory or storage device. In other embodiments, the first overcurrent value $I_{11}^{max}$ may be preset in the first comparator $A_{11}$, which may be a discrete IC. Upon detecting that the first supply current $I_{11}$ has exceeded the first overcurrent value $I_{11}^{max}$, the first comparator $A_{11}$ generates and transmits an overcurrent signal to a controller 200. In one or more embodiments, the controller 200 may be an embedded controller firmware (ECFW) of the portable electronic device. In other embodiments, the controller 200 may be part of the battery pack 41.

In response to receiving the overcurrent signal, the controller 200 reduces the power P of the battery pack 41 supplied to the portable electronic device so that the first supply current $I_{11}$ falls below the first overcurrent value $I_{11}^{max}$. As a result, the first battery cell $C_{11}$ can be protected from overcurrent despite being smaller and more susceptible to overcurrent than the second battery cell $C_{12}$.

Furthermore, the battery pack 41 of the battery pack comprises a FUSE, a C-FET, and a D-FET all connected in series to the first cell block 33 and controlled by the fuel gauge 100. When the total current $I_T$ reaches a maximum total current, determined by the comparator $A_0$, the controller 200 opens the D-FET and the total current $I_T$ is reduced.

Figure 4:
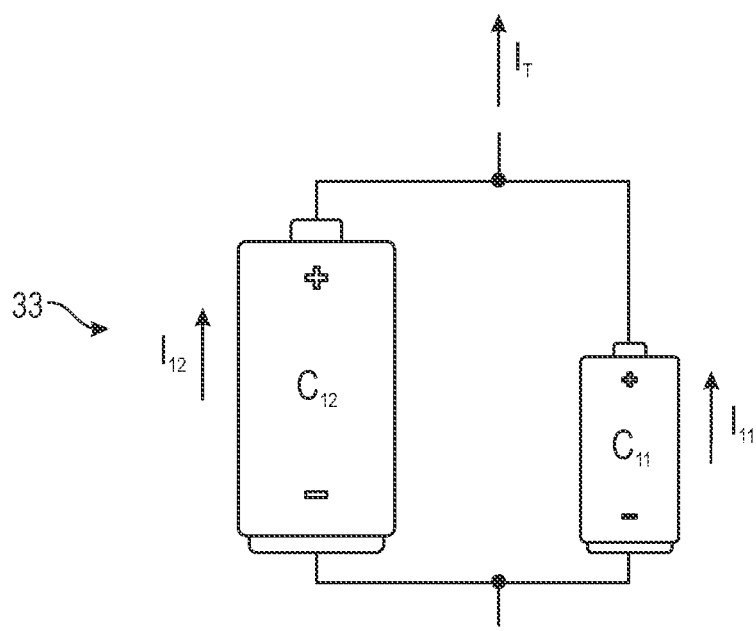
FIG. 4 shows an example of a cell block of FIG. 3.

FIG. 4 shows an example of the first cell block 33 of FIG. 3 according to one or more embodiments. The size and capacity of the first battery cell $C_{11}$ is smaller than the size and capacity of the second battery cell $C_{12}$. Consequently, the first overcurrent value $I_{11}^{max}$ of the first battery cell $C_{11}$ is lower than a second overcurrent value $I_{12}^{max}$ of the second battery cell $C_{12}$. For example, the first battery cell $C_{11}$ may have a capacity of 2 Wh and an overcurrent value (i.e., the first overcurrent value $I_{11}^{max}$) of 0.3 A, while the second battery cell $C_{12}$ may have a capacity of 4 Wh and an overcurrent value (i.e., the second overcurrent value $I_{12}^{max}$) of 0.7 A. During normal operation, the first and second battery cells $C_{11}$, $C_{12}$ form a current divider circuit in which, assuming that for example, when a total current of 1.0 A is supplied to the first cell block 33, the first supply current $I_{11}$ flowing through the first battery cell $C_{11}$ is 0.3 A and the second supply current $I_{12}$ flowing through the second battery cell $C_{11}$ is 0.7 A. For example, an overcurrent may occur in the first battery cell $C_{11}$ due to instability of internal impedance of the first or second battery cells $C_{11}$, $C_{12}$ caused by aging, noise in the total current $I_T$, aging and degrading of components of the battery pack, or failure of the battery pack. The low capacity makes the first battery cell $C_{11}$ particularly susceptible to overcurrent damage due to the relatively greater effects of overcurrent with respect to its first overcurrent value $I_{11}^{max}$. In this regard, even though the first battery cell $C_{11}$ has the lower overcurrent value, one or more embodiments can effectively protect the first battery cell $C_{11}$ against overcurrent damage. Thus, the smaller first battery cell $C_{11}$ may safely be fitted into a smaller space within the portable electronic device 1 that would otherwise be left empty, thereby increasing the overall capacity of the battery pack 41.

Figure 5:
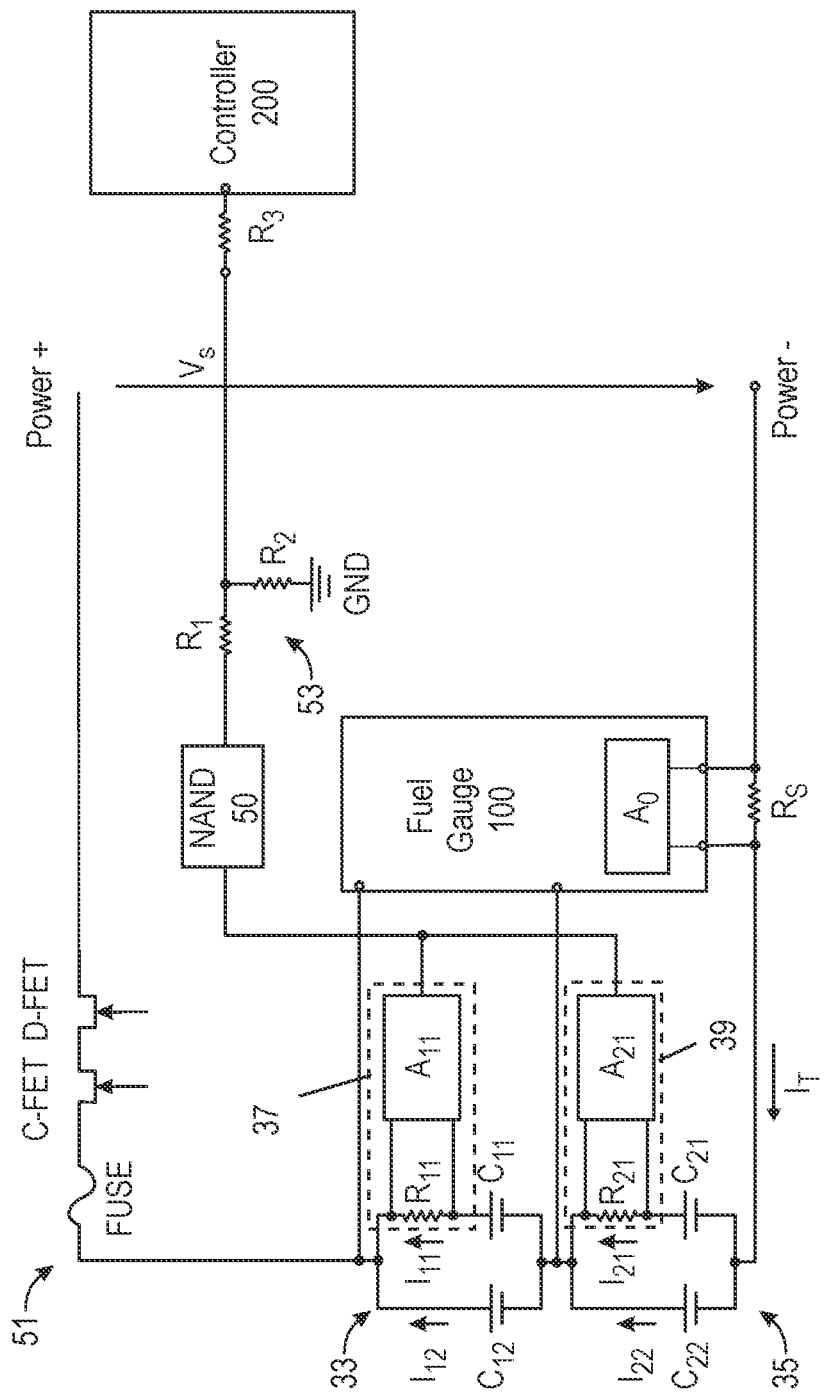
FIG. 5 shows another schematic diagram of a battery pack according to one or more embodiments.

FIG. 5 shows another schematic diagram of a hybrid battery pack 51 according to one or more embodiments. Compared to the battery pack 41 shown in FIG. 3, the battery pack 51 additionally comprises a second cell block 35 with a first battery cell $C_{21}$ and a second battery cell $C_{22}$. In one or more embodiments, the first battery cell $C_{21}$ may be smaller in size and capacity than the second battery cell $C_{22}$ and may therefore be fitted into a space within the portable electronic device 1 that would be too small for a larger battery cell.

The battery pack 51 additionally comprises, for the second cell block 35, a first overcurrent detection circuit 39 including a first comparator $A_{21}$ and a first measuring resistor $R_{21}$ connected in series to the first battery cell $C_{21}$. The first comparator $A_{21}$ measures the voltage across the first measuring resistor $R_{21}$ and determines a value of the first supply current $I_{21}$ therefrom. Then, the first comparator $A_{21}$ compares the value of the first supply current $I_{21}$ with a first overcurrent value $I_{21}^{max}$ of the first battery cell $C_{21}$. In one or more embodiments, the first comparator $A_{21}$ obtains the first overcurrent value $I_{21}^{max}$ from a memory or storage device. Upon detecting that the first supply current $I_{21}$ has exceeded the first overcurrent value $I_{21}^{max}$, the first comparator $A_{21}$ generates and transmits an overcurrent signal.

In one or more embodiments, an output of the first overcurrent detection circuit 37 of the first cell block 33 is connected to a first input of the logic circuit 50, and an output of the first overcurrent detection circuit 39 of the second cell block 35 is connected to a second input of the logic circuit 50. In the example shown in FIG. 5, the logic circuit 50 is a NAND gate, but in other embodiments, the logic circuit 50 may be a different logic circuit, e.g., an OR gate. An output of the logic circuit 50 is connected to the controller 200 of the portable electronic device by a voltage divider 53 and an input resistor $R_3$. The voltage divider 53 comprises a first resistor $R_1$ and a second resistor $R_2$. The first resistor $R_1$ is connected to the output of the logic circuit 50 and the second resistor $R_2$ is grounded. An output voltage of the voltage divider 53 emerges from the connection between the first and second resistors $R_1$, $R_2$ and is forwarded to the controller 200 via the input resistor $R_3$.

Thus, for the first cell block 33, when the first supply current $I_{11}$ exceeds the first overcurrent value $I_{11}^{max}$, the first overcurrent detection circuit 37 detects an overcurrent and outputs an overcurrent signal (e.g., a binary "LOW") to the logic circuit 50, which in turn outputs a logic signal (e.g., a binary "HIGH") to the controller 200. The controller 200 then reduces the power consumption of the portable electronic device regardless of the output of the first overcurrent detection circuit 39 of the second cell block 35.

Similarly, for the second cell block 35, when the first supply current $I_{21}$ exceeds the first overcurrent value $I_{21}^{max}$, the first overcurrent detection circuit 39 detects an overcurrent and outputs an overcurrent signal (e.g., a binary "LOW") to the logic circuit 50, which in turn outputs a logic signal (e.g., a binary "HIGH") to the controller 200. The controller 200 then reduces the power consumption of the portable electronic device regardless of the output of the first overcurrent detection circuit 37 of the first cell block 33.

Figure 6:
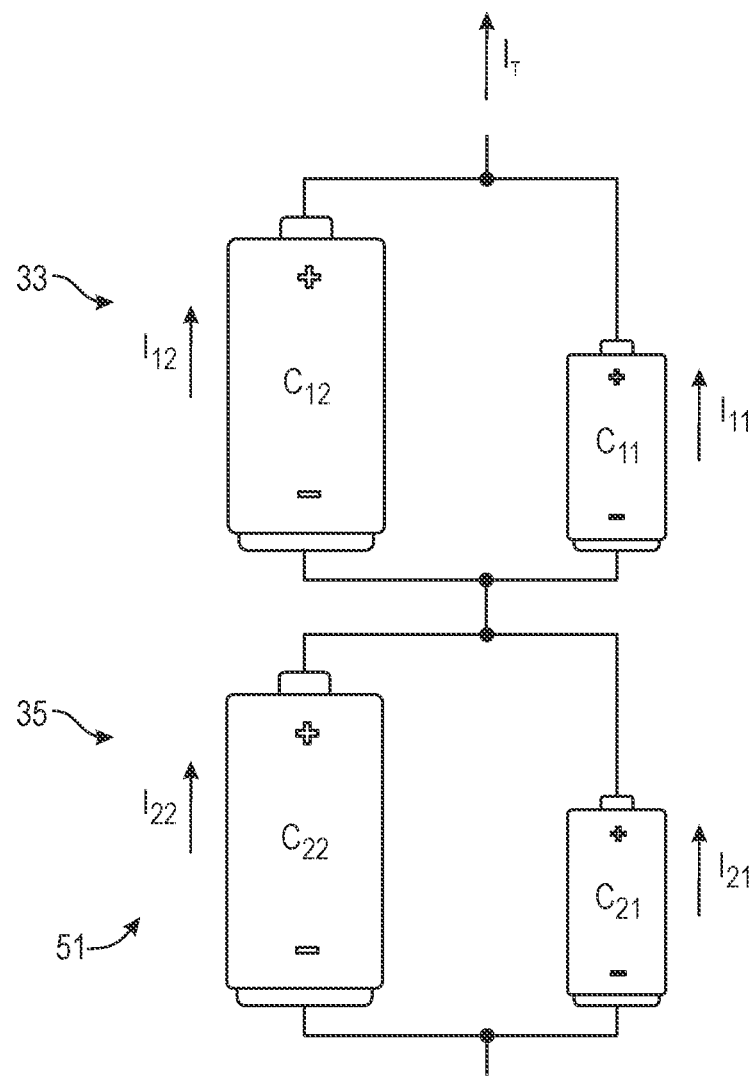
FIG. 6 shows an example of cell blocks of FIG. 5.

FIG. 6 shows an example of the first cell block 33 and second cell block 35 of the battery pack 51 of FIG. 5 according to one or more embodiments. With respect to the first cell block 33, the first battery cell $C_{11}$ has a size and capacity smaller than the second battery cell $C_{12}$. Similarly, with respect to the second cell block 35, the first battery cell $C_{21}$ has a size and capacity smaller than the second battery cell $C_{22}$.

Figure 7:
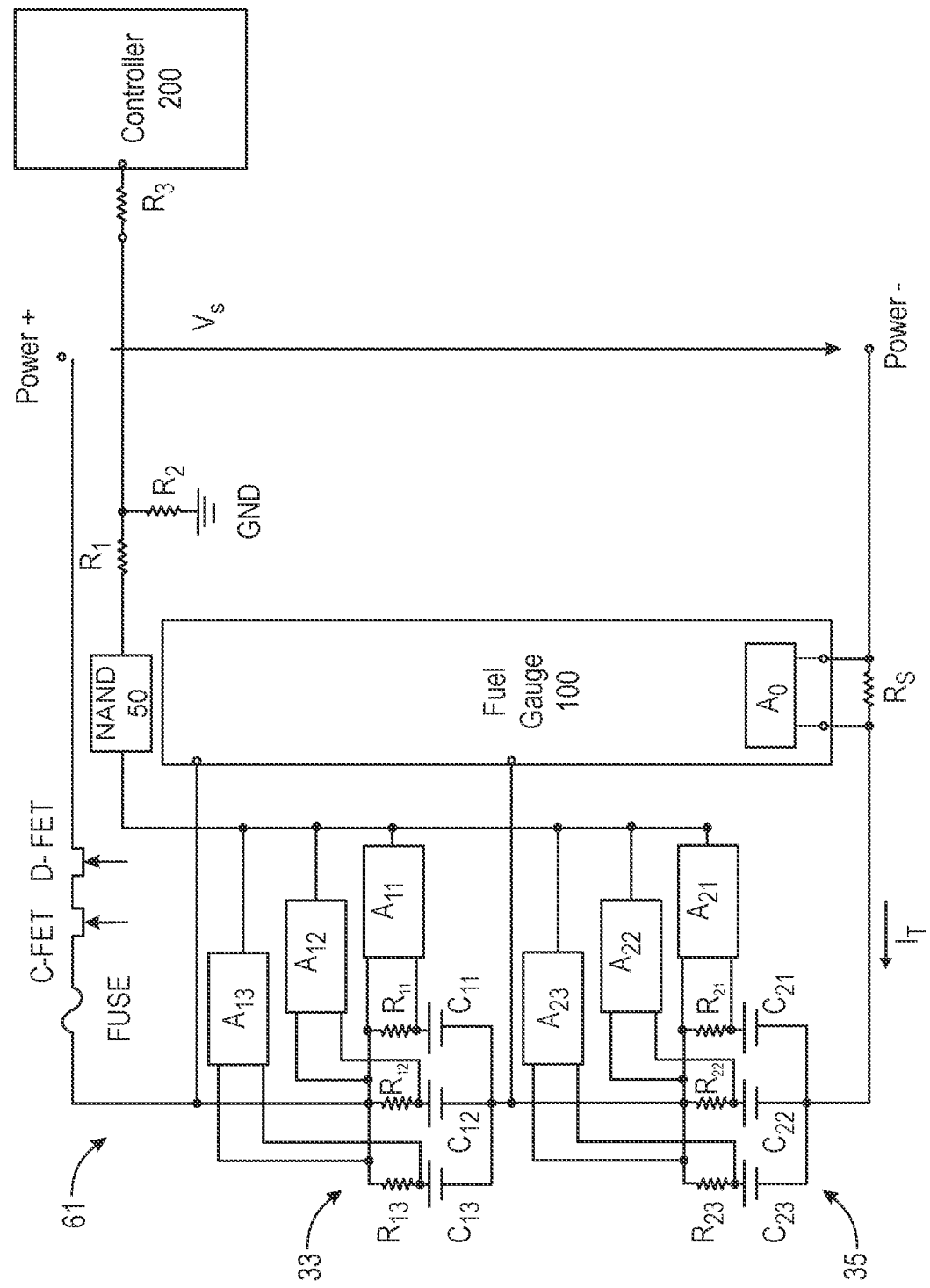
FIG. 7 shows another schematic diagram of a battery pack according to one or more embodiments.

FIG. 7 shows another schematic diagram of a hybrid battery pack 61 according to one or more embodiments. Compared to the battery pack 51 shown in FIG. 5, the battery pack 61 additionally comprises a third battery cell $C_{13}$ in the first cell block 33 and a third battery cell $C_{23}$ in the second cell block 35. With respect to the first cell block 33, the third battery cell $C_{13}$ is connected in parallel to the first and second battery cells $C_{11}$, $C_{12}$. With respect to the second cell block 35, the third battery cell $C_{23}$ is connected in parallel to the first and second battery cells $C_{21}$, $C_{22}$. The battery pack 61 additionally comprises, for each of the first and second cell blocks 33, 35, a second overcurrent detection circuit and a third overcurrent detection circuit, each of which is configured and operates similarly as the overcurrent detection circuits 37, 39 already discussed above.

For example, the second overcurrent detection circuit of the first cell block 33 includes a second comparator $A_{12}$ and a second measuring resistor $R_{12}$ connected in series to the second battery cell $C_{12}$. When the value of the supply current of the second battery cell $C_{12}$ exceeds the overcurrent value of the second battery cell $C_{12}$, the second comparator $A_{12}$ generates and outputs an overcurrent signal (e.g., a binary "LOW") to the input of the logic circuit 50, which generates and outputs a logic signal (e.g., a binary "HIGH") and transmits the logic signal to the controller 200. The controller 200 reduces the power consumption of portable electronic devices regardless of the outputs of the first and third comparators $A_{11}$, $A_{13}$ of the first cell block 33 or the first, second, and third comparators $A_{21}$, $A_{22}$, $A_{23}$ of the second cell block 35.

The same principle applies to the other overcurrent detection circuits, and their descriptions will be omitted for brevity.

Furthermore, some of the battery cells may be closer to a heat source than any other battery cell. A heat source may be a central processing unit (CPU) of the laptop. In one or more embodiments, regarding the first cell block 33, the third battery cell $C_{13}$ may be closer to a heat source than any other battery cell of any other cell block. This may stress the third battery cell $C_{13}$, in a manner that a third supply current $I_{13}$ flowing through the third battery cell $C_{13}$ exceeds a third overcurrent value $I_{13}^{max}$ of the first battery cell $C_{13}$. The third comparator $A_{13}$ will then detect an overcurrent in the third battery cell $C_{13}$ of the first cell block 33 and reduce the power P supplied to the portable electronic device.

Figure 8:
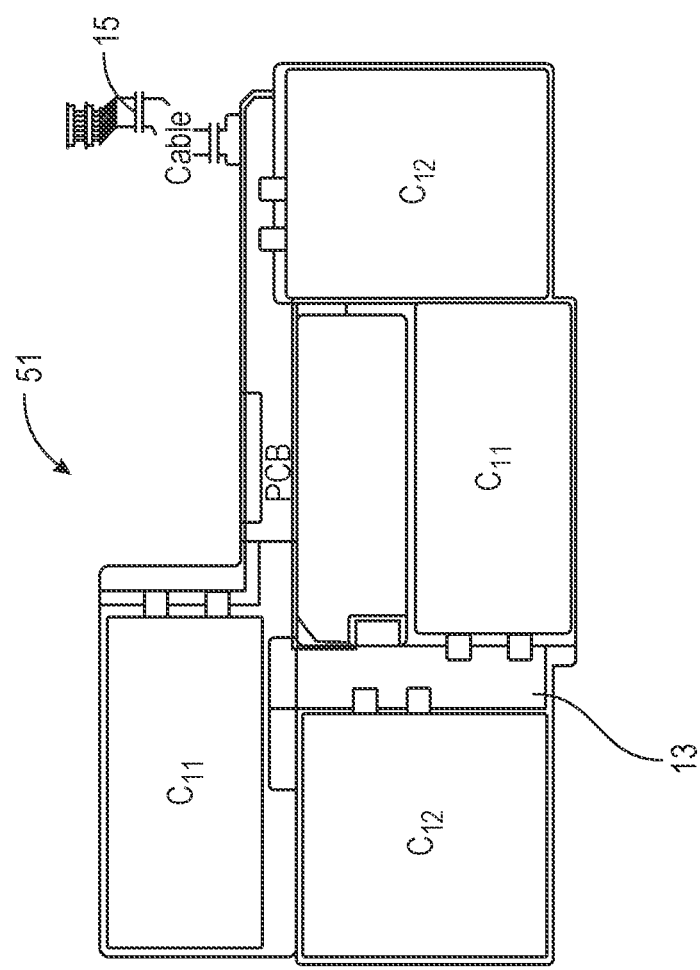
FIG. 8 shows a top view of a battery pack of FIG. 5 according to one or more embodiments.

The battery cells of the battery pack according to one or more embodiments may be arranged in any configuration that is suitable for the specific portable electronic device. For example, in one or more embodiments, the battery cells shown in FIG. 6 may be arranged as shown in FIG. 8.

Figure 9:
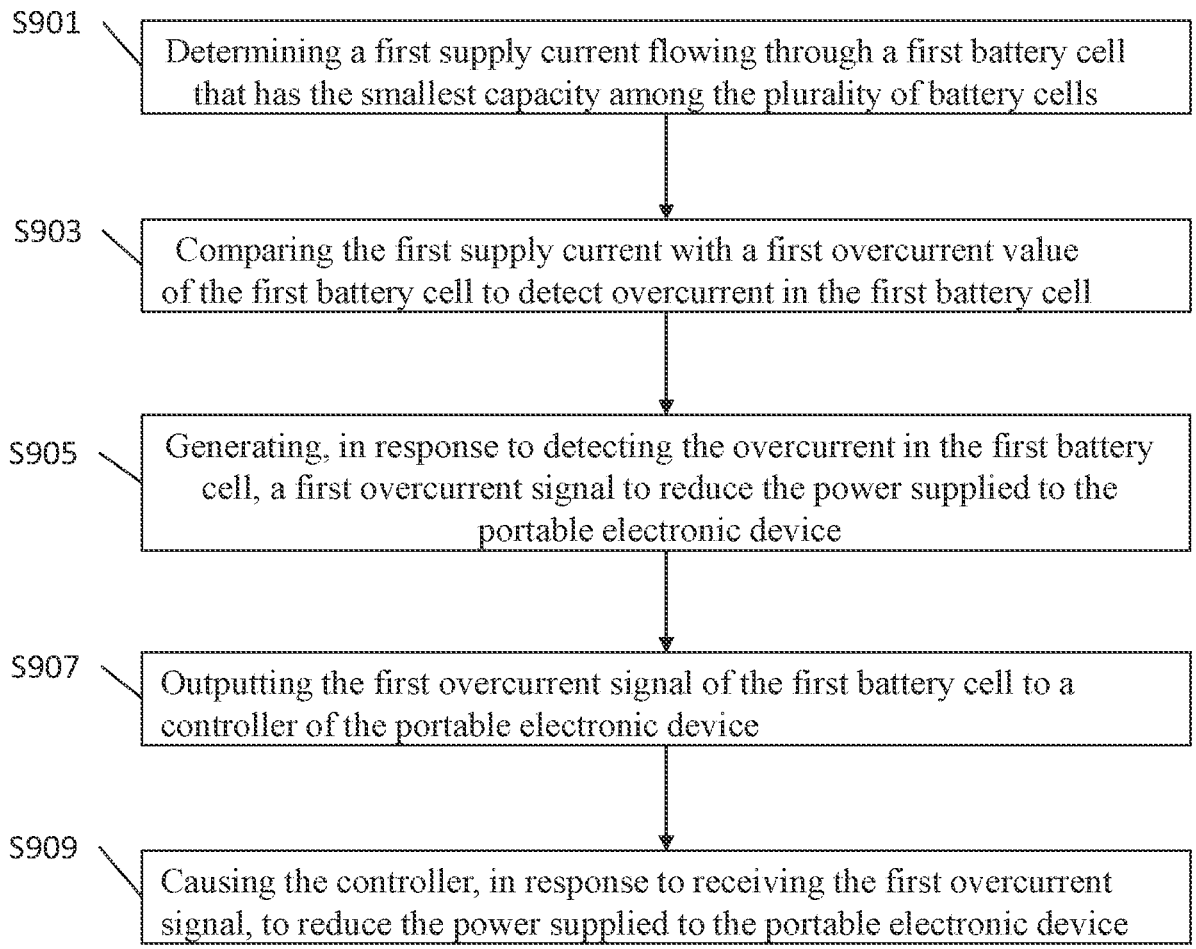
FIG. 9 shows a flowchart of a method for controlling a discharge of the battery pack according to one or more embodiments.
Figure 10:
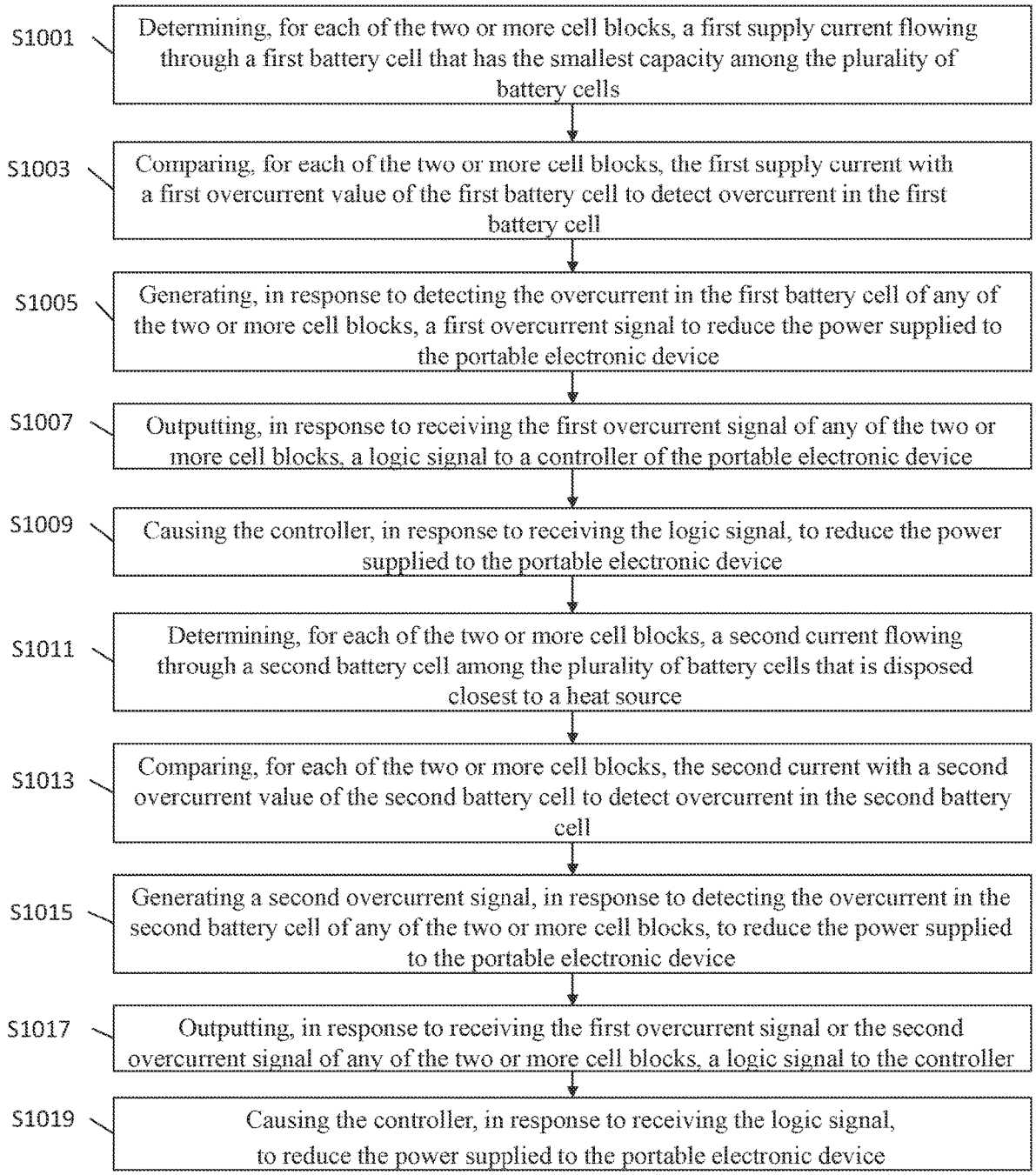
FIG. 10 shows another flowchart of the method for controlling a discharge of the battery pack according to one or more embodiments.

FIGS. 9 and 10 illustrate flowcharts in accordance with one or more embodiments. One or more of the steps shown in the flowcharts may be omitted, repeated, and/or performed in a different order than the order shown in FIGS. 9 and 10. Accordingly, the scope of the invention should not be considered limited to the specific arrangement of steps shown in these figures.

FIG. 9 shows a flowchart of the method for controlling a discharge of a battery pack with just one cell block according to one or more embodiments. The method comprises determining a value of a first supply current flowing through a first battery cell that has the smallest capacity among the plurality of battery cells (step S901); comparing the value of the first supply current with a first overcurrent value of the first battery cell to detect overcurrent in the first battery cell (step S903); generating, in response to detecting the overcurrent in the first battery cell, a first overcurrent signal to reduce the power supplied to the portable electronic device (step S905); outputting the first overcurrent signal of the first battery cell to a controller of the portable electronic device (step S907); and causing the controller, in response to receiving the first overcurrent signal, to reduce the power supplied to the portable electronic device (step S909).

FIG. 10 shows a flowchart of the method for controlling a discharge of a battery pack with two or more cell blocks according to one or more embodiments. The method comprises determining, for each of the two or more cell blocks, a value of a first supply current flowing through a first battery cell that has the smallest capacity among the plurality of battery cells (step S1001); comparing, for each of the two or more cell blocks, the value of the first supply current with a first overcurrent value of the first battery cell to detect overcurrent in the first battery cell (step S1003); generating, in response to detecting the overcurrent in the first battery cell of any of the two or more cell blocks, a first overcurrent signal to reduce the power supplied to the portable electronic device (step S1005); outputting, in response to receiving the first overcurrent signal of any of the two or more cell blocks, a logic signal to a controller of the portable electronic device (step S1007); causing the controller, in response to receiving the logic signal, to reduce the power supplied to the portable electronic device (step S1009); determining, for each of the two or more cell blocks, a second supply current flowing through a second battery cell among the plurality of battery cells that is disposed closest to a heat source (step S1011); comparing, for each of the two or more cell blocks, the second supply current with a second overcurrent value of the second battery cell to detect overcurrent in the second battery cell (step S1013); generating a second overcurrent signal, in response to detecting the overcurrent in the second battery cell of any of the two or more cell blocks, to reduce the power supplied to the portable electronic device (step S1015); outputting, in response to receiving the first overcurrent signal or the second overcurrent signal of any of the two or more cell blocks, a logic signal to the controller (step S1017); and causing the controller, in response to receiving the logic signal, to reduce the power supplied to the portable electronic device (step S1019).

One or more of the embodiments of the invention may have one or more of the following improvements to battery packs for portable electronic devices: battery packs are less susceptible to degradation; the decrease of capacity of battery packs is slowed down; the shortening of the discharge cycles of battery packs is slower in the long run. These advantages demonstrate that one or more embodiments of the present invention improve the management and monitoring of battery packs, in particular the state of discharge of battery packs.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for controlling a discharge of a battery pack that supplies power to a portable electronic device, wherein the battery pack comprises one or more cell blocks each comprising a plurality of battery cells connected in parallel, the method comprising:
  determining, for each of the one or more cell blocks, a value of a first supply current flowing through a first battery cell that has the smallest rated capacity among the plurality of battery cells of each respective one of the one or more cell blocks;
  comparing, for each of the one or more cell blocks, the value of the first supply current with a first overcurrent value of the first battery cell to detect overcurrent in the first battery cell; and
  generating, in response to detecting the overcurrent in the first battery cell of any of the one or more cell blocks, a first overcurrent signal to reduce the power supplied to all of the one or more cell blocks.

2. The method according to claim 1, wherein the battery pack has just one cell block, and the method further comprises:
  outputting the first overcurrent signal of the first battery cell of the one cell block to a controller of the portable electronic device; and
  causing the controller, in response to receiving the first overcurrent signal, to reduce the power supplied to the portable electronic device.

3. The method according to claim 1, wherein the battery pack has two or more cell blocks, and the method further comprises:
  outputting, in response to receiving the first overcurrent signal of any of the two or more cell blocks, a logic signal to a controller of the portable electronic device; and
  causing the controller, in response to receiving the logic signal, to reduce the power supplied to the portable electronic device.

4. The method according to claim 3, wherein the logic signal is output only in response to receiving the first overcurrent signal from at least two of the cell blocks.

5. The method according to claim 1, wherein the battery pack has two or more cell blocks, and the method further comprises:
  determining, for each of the two or more cell blocks, a value of a second supply current flowing through a second battery cell among the plurality of battery cells that is disposed closest to a heat source;
  comparing, for each of the two or more cell blocks, the value of the second supply current with a second overcurrent value of the second battery cell to detect overcurrent in the second battery cell; and
  generating a second overcurrent signal, in response to detecting the overcurrent in the second battery cell of any of the two or more cell blocks, to reduce the power supplied to the portable electronic device.

6. The method according to claim 5, further comprising:
  outputting, in response to receiving the first overcurrent signal or the second overcurrent signal of any of the two or more cell blocks, a logic signal to the controller; and
  causing the controller, in response to receiving the logic signal, to reduce the power supplied to the portable electronic device.

7. A battery pack for supplying power to a portable electronic device, comprising:
  one or more cell blocks each comprising a plurality of battery cells connected in parallel; and
  a first overcurrent detection circuit for each of the one or more of the cell blocks that:
    determines a value of a first supply current flowing through a first battery cell that has the smallest rated capacity among the plurality of battery cells of each respective one of the one or more cell blocks,
    compares the value of the first supply current with a first overcurrent value of the first battery cell to detect overcurrent in the first battery cell, and
    generates, in response to detecting the overcurrent in the first battery cell, a first overcurrent signal to reduce the power supplied to all of the one or more cell blocks.

8. The battery pack according to claim 7, wherein the battery pack has just one cell block, the first overcurrent detection circuit outputs the first overcurrent signal of the first battery cell to a controller of the portable electronic device, and the first overcurrent signal causes the controller to reduce the power supplied to the portable electronic device.

9. The battery pack according to claim 7, wherein the battery pack has two or more cell blocks, the battery pack further comprises a logic circuit connected to an output of each of the first overcurrent detection circuits, the logic circuit outputs, in response to receiving the first overcurrent signal from any of the first overcurrent detection circuits, a logic signal to a controller of the portable electronic device, and the logic signal causes the controller to reduce the power supplied to the portable electronic device.

10. The battery pack according to claim 9, wherein the logic circuit only outputs the logic signal in response to receiving the first overcurrent signal from at least two of the cell blocks.

11. The battery pack according to claim 7, further comprising:

the battery pack has two or more cell blocks, a second overcurrent detection circuit for each of the one or more cell blocks that:

determines a value of a second supply current flowing through a second battery cell among the plurality of battery cells that is disposed closest to a heat source, compares the value of the second supply current with a second overcurrent value of the second battery cell to detect overcurrent in the second battery cell, and generates, in response to detecting the overcurrent in the second battery cell, a second overcurrent signal to reduce the power supplied to the portable electronic device.

12. The battery pack according to claim 11, wherein the battery pack further comprises a logic circuit connected to an output of each of the second overcurrent detection circuits, the logic circuit outputs, in response to receiving the first overcurrent signal or the second overcurrent signal from any of the first overcurrent detection circuits or the second overcurrent detection circuits, a logic signal to a controller of the portable electronic device, and the logic signal causes the controller to reduce the power supplied to the portable electronic device.

13. A portable electronic device comprising the battery pack according to claim 7.

* * * * *